(12) United States Patent
Robinson et al.

(10) Patent No.: US 9,098,772 B2
(45) Date of Patent: Aug. 4, 2015

(54) RAPID DETECTION

(71) Applicant: RAYTHEON COMPANY, Waltham, MA (US)

(72) Inventors: Ian S. Robinson, Redondo Beach, CA (US); Bradley A. Flanders, Whittier, CA (US)

(73) Assignee: RAYTHEON COMPANY, Waltham, MA (US)

( * ) Notice: Subject to any disclaimer, the term of this patent is extended or adjusted under 35 U.S.C. 154(b) by 214 days.

(21) Appl. No.: 13/780,767

(22) Filed: Feb. 28, 2013

(65) Prior Publication Data

US 2014/0241633 A1     Aug. 28, 2014

(51) Int. Cl.
*G06K 9/62*     (2006.01)
*G06K 9/00*     (2006.01)
*G06K 9/46*     (2006.01)

(52) U.S. Cl.
CPC ............... *G06K 9/62* (2013.01); *G06K 9/0063* (2013.01); *G06K 9/6247* (2013.01); *G06K 2009/00644* (2013.01); *G06K 2009/4657* (2013.01)

(58) Field of Classification Search
CPC ............ G06T 2207/10036; G06T 7/0004; G06K 2009/00644
USPC ......................................................... 382/191
See application file for complete search history.

(56) References Cited

U.S. PATENT DOCUMENTS

| 6,940,999 | B2 | 9/2005 | Lin | |
| 8,649,607 | B1 * | 2/2014 | Hayat et al. | 382/199 |
| 2012/0263382 | A1 | 10/2012 | Robinson et al. | |

FOREIGN PATENT DOCUMENTS

EP     2511680 A2     10/2012

OTHER PUBLICATIONS (Yi Chen, "Simultaneous Joint Sparsity Model for Target Detection in Hyperspectral Imagery", Jul. 2011, IEEE Geoscience and Remote Sensing Letters, vol. 8).*
(Victor Mejia, "Anomaly Detection in Hyperspectral Images", Mar. 2007) http://www.math.ucla.edu/~wittman/hyper/victor/winter08__research.pdf.*
(Marc A. Kolodner, "An Automated target Detection System for Hyperspectral Imaging Sensors", Johns Hopkins APL Technical Digest, vol. 27, No. 3 (2007)).*
Dimitris Manolakis, "Is There a Best Hyperspectral Detection Algorith?", SPIE—Newsroom, 2009.
Dimitris Manolakis et al., "Hyperspectral Image Processing for Automatic Target Detection Applications", The Lincoln Laboratory Journal, New York, NY, US. vol. 14, No. 1, 2003, pp. 79-116.
Chein-I Chang, "An Optical Real-Time Adaptive Spectral Identification System (ORASIS)", Apr. 6, 2007, Hyperspectral Data Exploitation: Theory and Applications, Wiley, Hooken, NJ, pp. 77-106.
John R Smith, "Query Vector Projection Access Method", Proc. SPIE 3656, Storage and Retrieval for Imiage and Video Databases VII, vol. 3656, Jan. 23, 1999, pp. 511-522.

* cited by examiner

*Primary Examiner* — Stephen R Koziol
*Assistant Examiner* — Totam Le
(74) *Attorney, Agent, or Firm* — Burns & Levinson LLP; Joseph M. Maraia (57) ABSTRACT

In accordance with various aspects of the disclosure, a detecting engine for detecting targets/materials in hyperspectral scenes is disclosed. The detecting engine combines data partitioning and dimensionality reduction to reduce the number of computations needed to identify in which pixels in a hyperspectral scene a given material is present. Computation reduction (in some instances, by two fold) greatly impacts the speed of and power consumed by the detecting engine making the engine suitable for hyperspectral imaging of large scenes, processing using many filters per pixel, or missions requiring testing large numbers of reference spectra to see which are present in a scene.

9 Claims, 5 Drawing Sheets

RAPID DETECTION

BACKGROUND

This disclosure relates generally to the field of image processing, and more particularly to a system and a method for detecting materials in a hyperspectral scene.

In many conventional image processing scenarios comprising hyperspectral imaging (HSI) systems, hyperspectral sensors collect data of an image from one spatial line and disperse the spectrum across a perpendicular direction of the focal plane of the optics receiving the image. Thus a focal plane pixel measures the intensity of a given spot on the ground in a specific waveband. A complete HSI cube scene is formed by scanning this spatial line across the scene that is imaged. The complete HSI cube may be analyzed as a measurement of the spectrum, the intensity in many wavebands, for a spatial pixel. This spatial pixel represents a given spot on the ground in a cross-scan direction for one of the lines at a given time in the scan direction. These spectra are analyzed to detect targets or spectral anomalies.

SUMMARY

There is a need to make detection processing for hyperspectral imaging more efficient, so it can be scalable to large scenes of many pixels, or for missions in which it is desirable to test large numbers of reference spectra, using many filters per pixel to see which materials are present in the scene. Current processing techniques fall short of meeting this need. For example, approaches applying one or more detection filters per candidate target to every pixel of an HSI scene in which each pixel is a full dimension vector are not scalable, and will result in a large increase in the number of mathematical operations as the number of pixels and/or reference spectra increase. Another approach, using an RX anomaly detection filter to identify the 10% most anomalous pixels in an HSI scene and then applying reference spectra filters only to those top 10% of the pixels, can too often miss critical targets.

A detecting engine according to examples described herein address the foregoing need by reducing computations required for detection/identification by up to two orders of magnitude. In some examples, even more reduction may be possible. An overview of the detecting engine and its examples is provided immediately below.

The detecting engine partitions data into reduced dimensionality (DIMRED) pixels and "set aside" pixels of full dimension. The latter represent less than 1% of all pixels in a scene. The detecting engine reduces the DIMRED pixels in size by 10-20× compared to original data. The detecting engine further partitions the DIMRED pixels into pixels with spectral variety and those that are not well distinguished from each other. In test scenes, typically 80-95% of the pixels can be of low spectral variation and not distinguishable.

The detecting engine processes DIMRED pixels that show variation in REDUCED SPACE using an updated REDUCED dimension covariance and reports detections. The detecting engine processing in reduced dimension takes fewer computations because of the smaller dimensions of the vectors and matrices, and the smaller number of pixels processed. The detecting engine processes the small number of set aside pixels in full dimension using the full scene covariance. The detecting engine processing in full dimension takes fewer computations because of the paucity of set aside pixels.

Some examples of the detecting engine take an additional step of accepting or rejecting a library reference spectrum based on scene-wide testing using basis vectors. Prior to any pixel level testing, the detecting engine unmixes a reference spectrum using the current set of basis vectors associated with the scene. The detecting engine decides whether to test for the reference spectrum in the reduced dimension pixels based on the magnitude of residual vector of the reference spectrum. A large residual means it is very unlikely that the candidate target/material is in the reduced dimension pixels of the scene, since these pixels have small magnitude residuals (unlike the set aside pixels).

Some examples of the detecting engine include the set asides pixels in the pixels of spectral variation and then compare them to spectral libraries in REDUCED SPACE. The residual spectra of the set asides, the unique portion of those spectra, is compared against residual portions of spectral libraries and those results are fused with the DIMENSIONAL REDUCED comparisons from the same pixels.

In summary, the detecting engine partitions data into reduced dimension, set asides, and indistinguishable pixels while retaining targets of interest. The detecting engine reduces the number of computations needed by combining partitioning and dimensionality reduction. In some cases, the detecting engine reduces of the number of computations up to two orders of magnitude. As such, the speed of detection by the detecting engine is greatly improved and the computational and electrical power used by the detecting engine to detect targets is greatly reduced.

In accordance with an example, a method for detecting materials in a hyperspectral scene includes, in a detecting engine provided with: i) a spectral library of references in which each reference is a spectrum of a material, ii) dimensional reduced representations of the spectra of a first pluralities of pixels included in the hyperspectral scene, the representations including basis vectors and dimensional reduced coefficients, and iii) full spectra of a second plurality of pixels included in the hyperspectral scene, with respect to a subject spectrum of a respective material from the spectral library of references, for each pixel in the second plurality of pixels, determining a score indicative of the likelihood the spectrum of a respective pixel matches the subject spectrum of the respective material. The method further includes transforming the subject spectrum of the respective material into dimensional reduced library coefficients based on the provided basis vectors. The method further includes, for each pixel in the first plurality of pixels, determining which pixel is a spectrally variant pixel having dimensional reduced coefficients sufficiently different from dimensional reduced coefficients associated with other pixels. The method further includes, for each variant pixel, determining a score indicative of the likelihood that the dimensional reduced coefficients associated with a respective variant pixel match the dimensional reduced library coefficients of the respective material. The method further includes comparing the scores of both pluralities of pixels to thresholds. The method further includes based on the comparison, determining in which of the pixels in the hyperspectral scene the respective material is present.

In accordance with an example, a system for detecting materials in a hyperspectral scene includes a memory storing computer executable instructions and at least one interface receiving: i) a spectral library of references in which each reference is a spectrum of a material, ii) dimensional reduced representations of the spectra of a first pluralities of pixels included in the hyperspectral scene, the representations including basis vectors and dimensional reduced coefficients, and iii) full spectra of a second plurality of pixels included in the hyperspectral scene. The system further includes a detecting engine coupled to the memory and the at least one interface. The computer executable instructions when executed by the detecting engine cause the detecting engine to, with respect to a subject spectrum of a respective material from the spectral library of references, for each pixel in the second plurality of pixels, determine a score indicative of the likelihood the spectrum of a respective pixel matches the subject spectrum of the respective material. The detecting engine further caused to transform the subject spectrum of the respective material into dimensional reduced library coefficients based on the provided basis vectors. The detecting engine further caused to, for each pixel in the first plurality of pixels, determine which pixel is a variant pixel having dimensional reduced coefficients sufficiently different from dimensional reduced coefficients associated with other pixels. The detecting engine further caused to, for each variant pixel, determine a score indicative of the likelihood that the dimensional reduced coefficients associated with a respective variant pixel match the dimensional reduced library coefficients of the respective material. The detecting engine further caused to compare the scores to a threshold. The detecting engine further caused to, based on the comparison, determine in which of the pixels in the hyperspectral scene the respective material is present.

In accordance with an example, a tangible computer-readable storage medium storing computer readable instructions for processing images, which when executed by one or more processors cause the one or more processors provided with: i) a spectral library of references in which each reference is a spectrum of a material, ii) dimensional reduced representations of the spectra of a first pluralities of pixels included in the hyperspectral scene, the representations including basis vectors and dimensional reduced coefficients, and iii) full spectra of a second plurality of pixels included in the hyperspectral scene, cause the one or more processors to, with respect to a subject spectrum of a respective material from the spectral library of references, for each pixel in the second plurality of pixels determine a score indicative of the likelihood the spectrum of a respective pixel matches the subject spectrum of the respective material. The one or more processors further caused to, transform the subject spectrum of the respective material into dimensional reduced library coefficients based on the provided basis vectors. The one or more processors further caused to, for each pixel in the first plurality of pixels, determine which pixel is a variant pixel having dimensional reduced coefficients sufficiently different from dimensional reduced coefficients associated with other pixels. The one or more processors further caused to, for each variant pixel, determine a score indicative of the likelihood that the dimensional reduced coefficients associated with a respective variant pixel match the dimensional reduced library coefficients of the respective material. The one or more processors further caused to, compare the scores to a threshold. The one or more processors further caused to, based on the comparison, determine in which of the pixels in the hyperspectral scene the respective material is present.

In other examples, any of the aspects above can include one or more of the following features.

In some examples, determining the score indicative of the likelihood the spectrum of the respective pixel matches the subject spectrum of the respective material includes comparing the spectrum of the respective pixel and spectrum of the subject spectrum of the respective material, in full dimension, using a Matched Filter or Adaptive Cosine/Coherence Estimator (ACE).

In other examples, determining which pixels with dimensional reduced coefficients are variant pixels includes separating the variant pixels from the majority of similar pixels using Reed-Xiaoli (RX) anomaly detection in reduced dimensional space or residual magnitude scores.

In some examples, the score indicative of the likelihood that the dimensional reduced coefficients associated with the respective variant pixel match the dimensional reduced library coefficients of the respective material includes comparing the dimensional reduced coefficients associated with the respective variant pixel and dimensional reduced library coefficients of the respective material using a reduced dimension version of a matched filter (MF), Adaptive Cosine/Coherence Estimator (ACE) or (RACE).

In other examples, the method further includes calculating an error associated with the dimensional reduced library coefficients of the respective material, comparing the calculated error to a second threshold, and based on the comparison determining that the respective material is not present in any of the pixels in the hyperspectral scene represented by dimensional reduced coefficients.

In some examples, the detecting engine determines the score indicative of the likelihood the spectrum of the respective pixel matches the subject spectrum of the respective material by comparing the spectrum of the respective pixel and spectrum of the subject spectrum of the respective material, in full dimension, using a Matched Filter or Adaptive Cosine/Coherence Estimator (ACE).

In other examples, the detecting engine determines which pixels with dimensional reduced coefficients are variant pixels by separating the variant pixels from the pixels using Reed-Xiaoli (RX) anomaly detection in reduced dimensional space or residual magnitude scores.

In some examples, the detecting engine determines the score indicative of the likelihood that the dimensional reduced coefficients associated with the respective variant pixel match the dimensional reduced library coefficients of the respective material by comparing the dimensional reduced coefficients associated with the respective variant pixel and dimensional reduced library coefficients of the respective material using a reduced dimension version of a matched filter (MF), Adaptive Cosine/Coherence Estimator (ACE) or (RACE).

In other examples, the computer executable instructions when executed by the detecting engine further cause the detecting engine to calculate an error associated with the dimensional reduced library coefficients of the respective material, compare the calculated error to a second threshold, and based on the comparison determine that the respective material is not present in any of the pixels in the hyperspectral scene represented by dimensional reduced coefficients.

These and other features and characteristics, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various Figures. It is to be expressly understood, however, that the drawings are for the purpose of illustration and description only and are not intended as a definition of the limits of claims. As used in the specification and in the claims, the singular form of "a", "an", and "the" include plural referents unless the context clearly dictates otherwise.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

DETAILED DESCRIPTION

In the description that follows, like components have been given the same reference numerals, regardless of whether they are shown in different examples. To illustrate an example(s) of the present disclosure in a clear and concise manner, the drawings may not necessarily be to scale and certain features may be shown in somewhat schematic form. Features that are described and/or illustrated with respect to one example may be used in the same way or in a similar way in one or more other examples and/or in combination with or instead of the features of the other examples.

Figure 1:
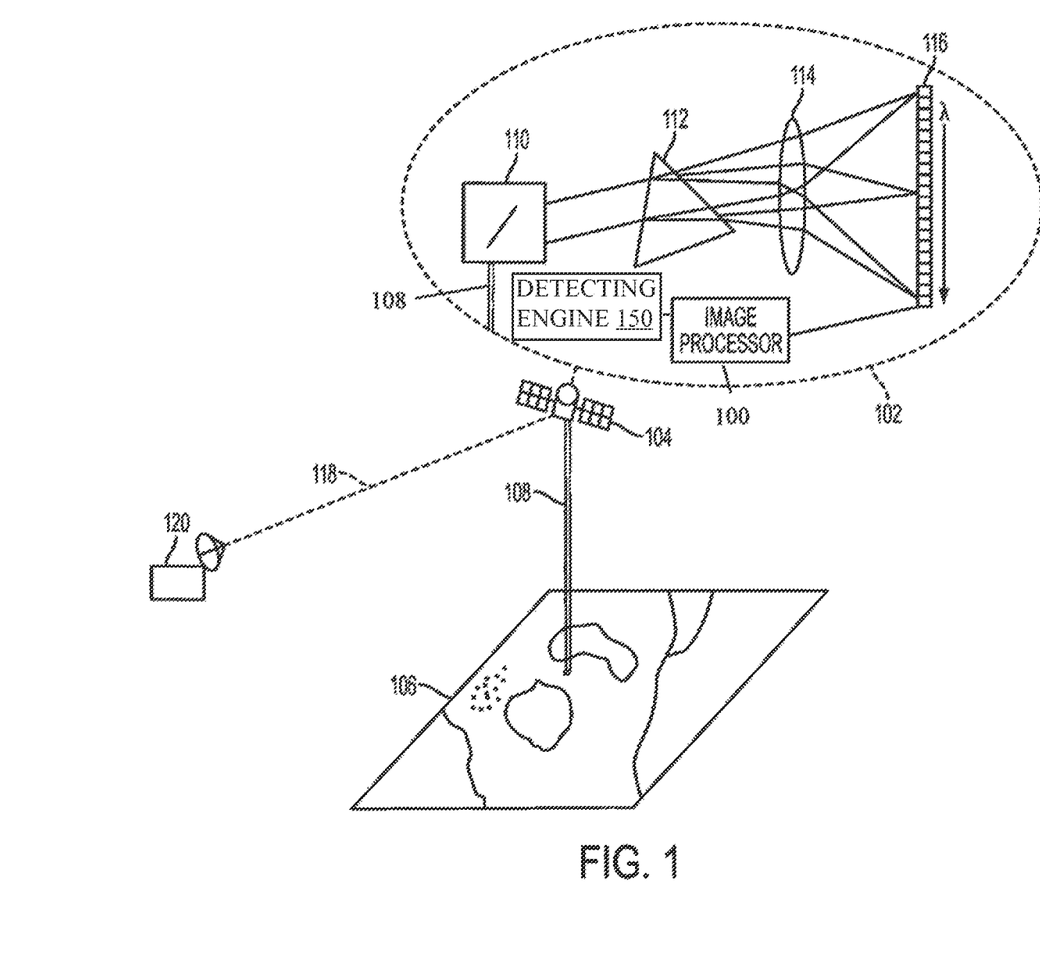
FIG. 1 is a block diagram of an example imaging system.

Depicted in FIG. 1 is an example of imaging system 102 that is configured to process images and to detect materials/target in scenes. By way of example only, imaging system 102 may be a hyperspectral imaging system. The term "hyperspectral" refers to imaging narrow spectral bands over a continuous spectral range, and producing the spectra of all pixels in a scene (e.g., scene 106). Imaging system 102 may be stationary or mobile, airborne or land based (e.g., on an elevated land structure or building), or may be on an aircraft or a satellite. As shown, imaging system 102 may incorporate image processor 100, and may be coupled to or otherwise contained within remote imaging system 104. Remote imaging system 104 may be of any suitable construction or configuration, including but not limited to comprising a satellite, an aerial surveillance system, or any other system that can capture images. Additionally, remote imaging system 104 may be stationary or mobile. In an example, imaging system 102 and remote imaging system 104 may be configured to capture one or more images of a particular scene 106 corresponding to a geographical area (e.g., a ground terrain).

In an example, remote imaging system 104 may be configured to use imaging system 102 to capture hyperspectral image(s) of scene 106 that are provided as input hyperspectral image (HSI) scenes to image processor 100. In an example, hyperspectral imaging system 102 may include one or more scan mirrors 110, or may include other optics arranged to receive light 108 reflected from one or more ground resolution cells. Light 108 reflected from one or more ground resolution cells, and generally the entire scene 106, may be used by image processor 100 to determine an input reflectivity of input HSI scene. Input HSI scene may be a part of scene 106, or may be the entire scene 106 depending upon specific target detection goals. In an example, scan mirrors 110 or the other optics may then direct light 108 through dispersing element 112, which may be arranged to separate light 108 into various different wavelengths (i.e., a spectra). After being separated into the various different wavelengths, light 108 may then be directed to one or more imaging optics 114, which may focus the various wavelengths onto a focal plane of detector array 116. As such, detector array 116 may capture hyperspectral data across the spectrum of wavelengths, thereby generating a data set corresponding to a hyperspectral image of scene 106. By way of example only, such a data set formed across the spectrum of wavelengths may be used to construct a hyperspectral image data cube (or, an HSI data cube), such as that described in the above-referenced U.S. application Ser. No. 13/446,869, incorporated by reference in its entirety herein. For example, the HSI data cube may be scanned and input to image processor 100. In an example, the HSI datacube is a three dimensional (3D) data cube with two spatial dimensions corresponding to the spatial dimensions of scene 106, and a third spectral dimension corresponding to the spectra of wavelengths measured for each spatial location. The focal plane, which includes the line of detectors shown in 116, is composed of focal plane pixels, which specify a location in one cross-scan spatial dimension and one spectral band. For example, scanning of two-dimensional scene 106 over a spectrum of wavelengths by imaging system 102 creates an additional spatial dimension, resulting in the 3D HSI data cube. Any two of the three dimensions of the HSI data cube may be selected by image processor 100 to form a two dimensional image input to image processor 100 for processing, in accordance with various examples described herein. For example, spatial pixels may be defined as a spatial location in two-dimensional Cartesian coordinates. As a result, the 3-D HSI data cube comprises a spectrum for each spatial pixel and may be analyzed by image processor 100 as a set of spectra for the spatial pixels. Alternatively, the 3D HSI cube comprises a set of samples at different times along the scan direction for each focal plane pixel and may be analyzed by image processor 100 as a set of samples along the scan direction for each cross-scan spatial location and spectral waveband. As described herein, the term "sample" refers to a focal plane pixel, at a particular reflective wavelength ($\lambda$) and cross-scan location, at a specific time in the scan. Likewise, the term "samples" refers to the focal plane pixel at the particular reflective wavelength and cross-scan location at a set of different time instances, respectively.

Following the generation of the data set in the 3-D HSI data cube corresponding to the hyperspectral image of scene 106, image processor 100 may process the data set so as to reduce the dimensionality of the hyperspectral input scene image and/or decompose the input scene image into a compressed scene image and a hyperspectral residual image, as described in greater detail below. Using alternative terminology, the 3-D data cube may be decomposed into a compressed scene data cube and a residual scene data cube.

Such decomposition may be performed by image processor 100, for example, by approximating the spectra of each spatial pixel in the 3-D HSI data cube, as a linear combination of basis vectors (BVs) having coefficients to best approximate the 3D HSI data cube and storing the errors in this approximation in the residual data cube. Such decomposition of the input scene spectra into BVs by the image processor 100 is described, for example, in U.S. application Ser. No. 13/085,883, incorporated by reference in its entirety herein.

When the complete set of input scene spectra is considered, image processor 100 may decompose the input HSI data cube using BV coefficients for the spectra of each spatial pixel in the data cube. The term reduced dimensionality is used herein because the number of BV coefficients is smaller than the number of wavebands in the original datacube. Additionally, BVs may be used to quickly detect materials in scenes, as described in greater detail below.

In one example, the compressed scene image (or, compressed image) is a reduced dimensionality scene representation of the input hyperspectral scene image derived from input 3D HSI data cube, and obtained at detector array 116. In an example, as described in greater detail below, the degree to which the dimensionality of the image is reduced in the compressed image and/or whether the dimensionality reduction is to be classified as lossy or lossless may be determined by adjustable features of imaging system 102. The hyperspectral residual image or data cube is comprised of the errors in each spectral waveband for each spatial pixel from the decomposition of the input hyperspectral scene image, and is substantially devoid of any content associated with scene 106, although in some examples, under less than ideal conditions, such as an inadequate BV set, some scene structure may leak into the residual image or the residual scene data cube. In addition to decomposing an input HSI data cube, BVs may also be used to quickly detect materials in scenes.

As shown, the imaging system 102 may also incorporate a detecting engine 150 for detecting material/targets in scenes. Typically, the detection process involves testing measured spectra against large libraries of potential targets/materials, and there may be no a priori knowledge of content. In particular, target detection requires comparing each pixel in a scene against very large spectral libraries. The problem of detecting targets in scenes can be characterized as testing L candidate target spectra against each of P measured pixels of vector Dimension D or L×P×D. A typical mission includes millions of pixels and thousands of sample spectra leading to billions of computations needed to detect targets in scenes. This is not practical for the detecting engine 150.

Instead, examples of the detecting engine 150 reduce some or all of L, D, and P. The detecting engine 150 eliminates uninteresting/common pixels without throwing away targets. The detecting engine 150 then processes all/most of the remaining pixels with reduced dimensionality. In operation, some examples of the detecting engine 150 reduce the number of P to ~0.1 P (representing about a 10× reduction in number of computations needed) and reduce D from 100 s to 10 s (representing another 10× reduction in number of computations needed). There is a small overhead to eliminate pixels and reduce vector size. The detecting engine 150 take extra steps to preserve targets, as described in greater detail below. The detecting engine 150 eliminates some (possibly many) of the L spectra using BV unmixing errors (computational savings depends on library and scene but could be an additional 10×).

At a high level, examples of the detecting engine 150 speed-up HSI detection of materials, that is, reduce the number of computations needed, by parsing data into streams that are compared with references more efficiently while maintaining the spectral accuracy needed to make accurate determinations of material. A convenient example of the detecting engine 150 also parses the reference library into streams that can be compared more efficiently with the scene spectral content.

Examples of the detecting engine 150 employ a technique predicated on having a dimensionally reduced scene with spectral errors less than a threshold for every pixel. The detecting engine 150 uses BVs that allow most pixel spectra to be accurately approximated with a small number of basis vector coefficients. Each pixel spectral error is compared to the error threshold and those pixels which exceed the threshold are included with their original full spectra (and no error).

Figure 2:
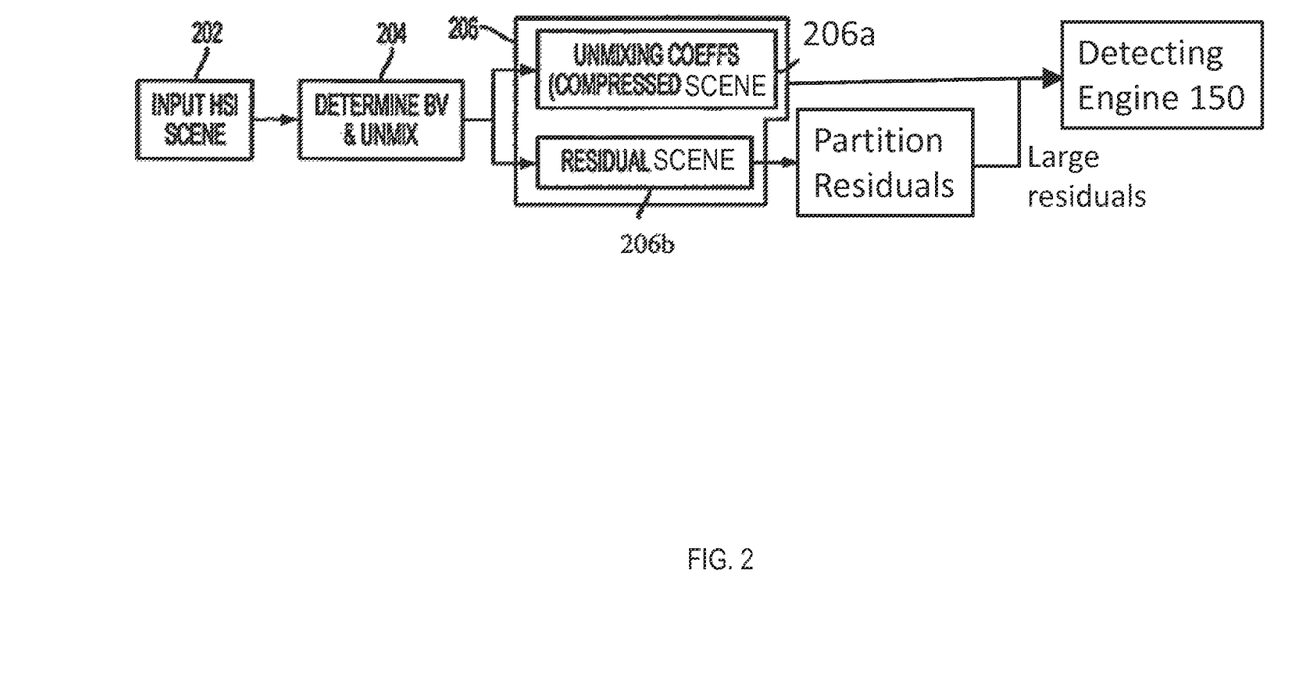
FIG. 2 is a block diagram of an example process for processing images.

FIG. 2 illustrates flow diagram for a process 200 for processing images, in accordance with an example. In one example, the residual HSI image is extracted from an input HSI data cube. Accordingly, although the operations below are being described with respect to one or more residual or compressed images, the operations may be carried out on complete or whole data cubes having a plurality of such images. That is, instead of the terms "image," "images," "composite image," "composite images," "residual image," or "residual images," the terms "data cube," "data cubes," "composite data cube," "composite data cubes," "residual data cube," or "residual data cubes," respectively, may equally be used without departing from the scope of the examples described herein. Further, an image or images may be formed from extracting data of any two of the three dimensions that make up the data cube. For example, image processor 100 may carry out operations on the whole data cube, and as such, the hyperspectral image is actually a 3D image. It can be thought of as spectra for each 2D location or as many 2D scene images in different spectral bands. Some of the processing is done on the whole cube; some is done on images produced from the 3D HSI data cube. Processing done on the whole 3D HSI data cube may be in one dimension (ID) and may be applied to all samples in the other two dimensions, for example, for spectral processing of all the 2D spatial pixels or sample processing of all the 2D focal plane pixels.

In an operation 202, image processor 100 receives one or more hyperspectral images (or, input data cubes) corresponding to an input HSI scene (obtained from scene 106 or a factory supplied image or data cube). In one example, the input HSI scene may have a plurality of images or image frames obtained across various different wavelength bands ($\lambda$) at the focal plane of detector array 116. Alternatively, as also noted above, the whole 3-D HSI data cube may be received at image processor 100 for processing. The input scene image or the input HSI data cube associated with the input scene image may then be provided to image processor 100 for processing. Input scene image may include a plurality of pixels arranged according to a coordinate system (e.g., X-Y Cartesian coordinate system). By way of example only, such pixels may be focal plane pixels and/or spatial pixels, as defined above.

In an operation 204, basis vectors (BVs) associated with each spatial pixel in the input scene image are determined by image processor 100. Each BV used to describe the input scene image represents a spectrum, the intensity at each wavelength, which is a component of each spatial pixel's spectrum. Image processor 100 determines coefficients associated with the BVs for each of the spatial pixels and unmixes the BV representation of the input scene image. The input HSI scene image can be approximately represented as a linear sum of coefficient weighted basis vectors; and the residual components are the error at each waveband for each spatial pixel in this approximation. In one example, a small number of BVs may be used to characterize most of the input scene image. Such a process of determining BVs may include starting with a seed BV and establishing additional BVs to complete a set of BVs that represent the input scene image. The additional BVs may be used to remove scene structure from the residual datacube and residual images derived therefrom. Scene structure may be defined as material in scene 106 with a spectrum that is different from the spectra of other things or items in scene 106. Unmixing of the BVs comprises carrying out a linear fit of vectors to approximate the input scene image. Details of determining BVs and unmixing them are provided in the above-referenced U.S. application Ser. No. 13/085,883, incorporated by reference herein, and will not be described, although other techniques of BV representation of images may be applied by image processor 100 to approximate input scene image leaving artifacts and noise in the residual scene.

In an operation 206, unmixing BVs from every pixel, yields the compressed scene image 206a having unmixed BV coefficients, and residual image 206b. When complete data cubes are processed by image processor 100, a residual HSI data cube (or, residual scene data cube) may be obtained by projecting out one or more basis vectors from every spatial pixel in the input HSI data cube. Ideally, residual image 206b or the residual data cube has no scene structure, because the scene structure is contained in the reduced dimensionality scene image 206a. The error spectra of unmixed BVs form residual image 206b, which may contain sensor artifacts with very little scene content.

The process of unmixing the input scene image or input HSI data cube into compressed scene image 206a (or, compressed scene data cube) and residual image 206b (or, residual scene data cube) is referred to herein by terms "decomposition," "decomposing," "transformation," or "transforming" of input scene image or input HSI data cube. One example of the image processor 100 determines which of the pixels in the input scene image cannot be represented to sufficient accuracy by a set of basis vector coefficients based on the residual image 206b.

The image processor 100 then provides these pixels in full dimension to the detecting engine 150 for further processing. The image processor 100 provides BVs associated with some of spatial pixel in the input scene image and unmixed BV coefficients to the detecting engine 150.

Figure 3A:
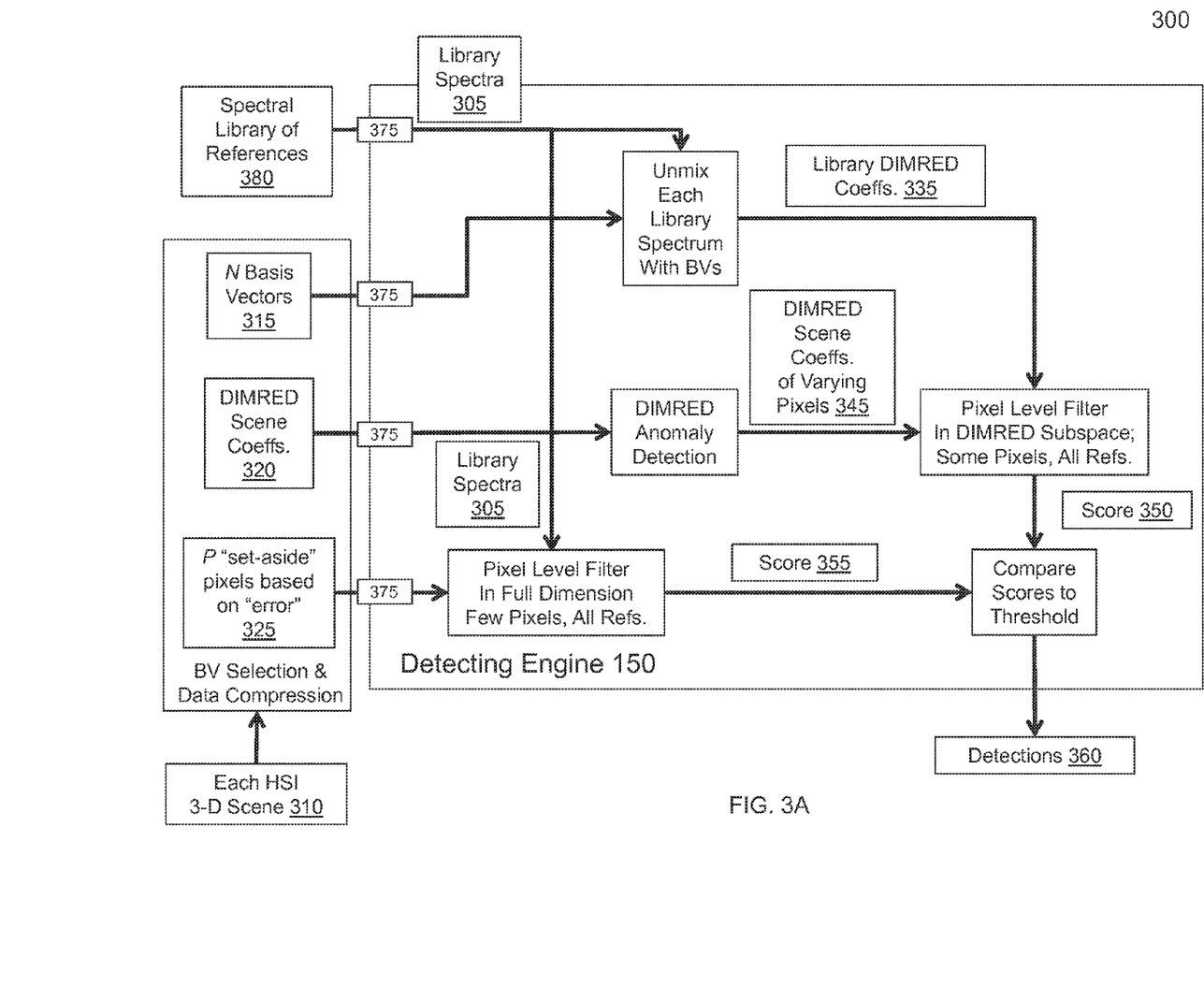
FIGS. 3A and 3B are block diagrams of example systems for detecting materials/targets in scenes.
Figure 3B:
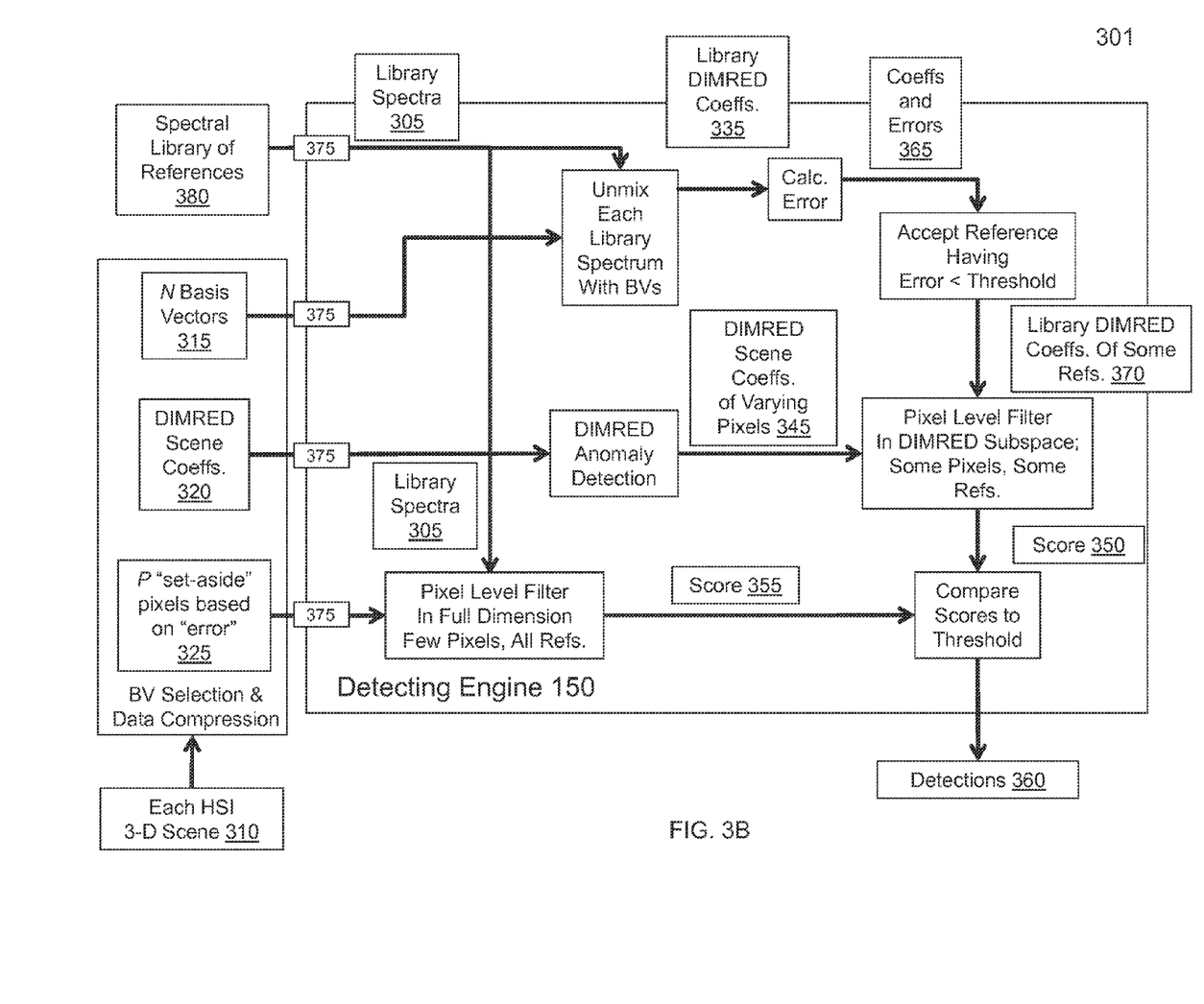

FIGS. 3A and 3B show examples of the detecting engine 150 detecting in which of a 1 million pixels in a hyperspectral scene, materials or targets from a library of 1000 references are present. The spectra of a given pixel has 256 wavelengths referred to as "dimensions." The standard approach to detection compares the spectra of 256 dimensions of each 1 million scene pixels against the spectra of 256 dimensions of each of the 1000 references. The standard approach represents billions of calculations. The detecting engine 150 reduces the number of pixels (P), references (L), and/or dimensions (D) used to detect in which of the pixels in the hyperspectral scene materials or targets from the library of references are present. In the description below, numbers in parenthesis are example values that may be achieved by this and other examples of the detecting engine 150.

Inputs to the detecting engine 150 include 1000 library spectra or simply "references" 305 (provided from a library of spectral references 380 for example) and an HSI scene 310 with spectra for each of the 1 million pixels in the scene. Most of the HSI scene pixels provided to the detecting engine 150 are represented by (e.g., 15) dimension reduced basis vector (BV) coefficients 315, along with a set of basis vector spectra 320 (e.g., 15 spectra in 256 wavelengths) needed to reconstruct spectra from the set of coefficients 315. The dimensional reduced representation of the spectra of a majority of the pixels may be provided as the result of image processing by the image processor 102 described above or by a dimension reduction process with error control on every pixel, such as one described by U.S. application Ser. No. 13/085,883. A small number of pixels (e.g. 5000) that cannot be represented to sufficient accuracy by the set of basis vector coefficients 315 are included in the input data with their full original spectra.

The detecting engine 150 compares the vast majority of the pixels in the HSI scene 310 to the references 305 in dimensional reduced (DIMRED) space, resulting in a 10-20× savings in calculations. The detecting engine 150 transforms the references 305 into dimensional reduced library coefficients 335 based on the basis vectors 315. The detecting engine 150 then performs the reduced spectral comparison with the references 305 expressed in dimensional reduced library coefficients 335. Error control in the input dimension reduced cube enables accurate spectral comparisons of dimension reduced pixels with fewer calculations because the number of basis vectors is less than the number of spectral bands.

The detecting engine 150 uses the basis vectors 315 to split the pixels into a stream of pixels with dimensional reduced coefficients, referred to as "REDUCED pixels" and another stream of pixels with full spectrum, referred to as "ORIGINAL pixels." The REDUCED pixels typically account for about 99% of the total number of scene pixels. The detecting engine 150 reduces the number of dimensions (D) of the REDUCED pixels used for detecting by 10-20×. For example, while the detecting engine 150 may represent the ORIGINAL pixels by 100-400 elements (depending on sensor/mission), the detecting engine 150 may represent the REDUCED pixels by 10-20 elements, which are labeled "DIMRED Scene Coeffs" 320 in FIG. 3B.

The detecting engine 150 further determines which of the REDUCED pixels are so common and self-similar that they should not be processed further. The detecting engine 150 partitions the REDUCED pixels into common and spectrally different pixels called "VARYING pixels" using a Reed-Xiaoli (RX) anomaly filter in reduced dimension (which is very fast) or by using residual magnitude scores. Any pixels that are sufficiently different from the bulk of the reduced pixels either in their RX score or in the magnitude of the residual error in the reduced dimension representation are considered potential target detections and passed to the DIMRED spectral filter. The VARYING pixels are represented, in part, by DIMRED Scene Coeffs 345. The most common pixels are labeled "IGNORE pixels" and typically account for 80-95% of the REDUCED pixels.

In operation, the detecting engine 150 runs the anomaly filter with an anomaly threshold adjusted to allow many pixels through, e.g., 5-20%, far more than in the usual application of an anomaly filter. The purpose is not to find a few anomalies but to find all unusual pixels. Some examples of the detecting engine 150 do not run the anomaly filter in DIMRED space when the number of materials in the reference library is small. When searching a very large library, however, it may be beneficial to apply this single test to the pixels first.

The detecting engine 150 detects targets in the remaining 5-20% that are VARYING pixels, reducing the number of pixels (P) used in detecting by 5-20×. The detecting engine 150 compares the spectra of the VARYING pixels with the library of target spectra in DIMRED space. For example, the detecting engine 150 uses REDUCED dimension versions of standard filters, such as matched filter (MF) or Adaptive Cosine/Coherence Estimator (ACE). In particular, the detecting engine 150 computes the covariance (COV) for the VARYING pixels in reduced space, separately.

The detecting engine 150 compares the dimensional reduced library coefficients 335 and DIMRED coefficients 345 of the VARYING pixels. Based on the comparison, the detecting engine 150 determines a score 350. The score 350 is indicative of the likelihood the DIMRED coefficients 345 of a given VARYING pixel (dimensional reduced coefficients associated with a respective spectrally different pixel) matches the dimensional reduced library coefficients 335 of a given material (dimensional reduced library coefficients of a respective material).

Turning now to the other stream of pixels, the ORIGINAL pixels are the "most unique" pixels in the HSI scene 310. These pixels typically account for less than 1% (0.1-1%) of the total number of scene pixels. In FIGS. 3A and 3B, the ORIGINAL pixels are labeled "set aside pixels." The detecting engine 150 compares each of the ORIGINAL pixels/set aside pixels 325 to the references 305 in full dimension to maintain sufficient accuracy.

To detect targets in the ORIGINAL pixels/set aside pixels 325, the detecting engine 150 uses full dimension data filters, such as matched filter (MF) or Adaptive Cosine/Coherence Estimator (ACE). Normally, testing every pixel in all dimensions takes a long time (many pixels, many dimensions). The detecting engine 150, however, performs this step very quickly. The detecting engine 150 reduces the number of pixels to test to less than 1% of the total number of scene pixels. The result is a 100-1000× savings in calculations compared to the original data. Based on the comparison, the detecting engine 150 determines a score 340. The score 340 is indicative of the likelihood the spectrum of a given set aside pixel 325 matches a given reference 305

The detecting engine 150 compares the scores 350 and 355 to a threshold. Based on the comparison, the detecting engine 150 determines in which of the scene pixels a subject material is present, shown in FIGS. 3A and 3B as detection 360.

FIG. 3B shows another example of the detecting engine 150. In addition to operations described above with reference to FIG. 3A, the detecting engine 150 further reduces the number of references 305 used in detection. The detecting engine 150 computes for each of the dimensional reduced library coefficients 335 a magnitude of a residual vector, also referred to as an "error" 365. The detecting engine 150 then determines whether the computed error 365 associated a respective dimensional reduced library coefficients 335 of a given material is below a threshold (which may be set by a user of the imaging system 102). If the detecting engine 150 determines that the error 365 for a given reference is below the threshold, then the detecting engine 150 accepts the given reference. If the error 365 is above the threshold, that reference is not tested in the DIMRED filter. For example, the detecting engine 150 uses a candidate spectrum represented by the respective dimensional reduced library coefficients 370 in tests on scene pixels.

As shown in FIG. 3A, the detecting engine 150 may be part of a system 300 for detecting materials in hyperspectral scenes. (Similarly in FIG. 3B showing system 301.) The system 300 includes memory (not shown) and at least one interface 375. The memory stores computer executable instructions that when carried out by the detecting engine 150 cause the detecting engine 150 to perform the operations described above with reference to FIGS. 3A and 3B. In some examples of the system 300, the memory also stores the spectral library of references 380. The interface 375 receives the references 305, dimensional reduced representations of the spectra of some pixels in the hyperspectral scene (e.g., a second plurality of pixels included in the hyperspectral scene), the representations including basis vectors 315 and dimensional reduced coefficients 320, and full spectra 325 of other pixels in the hyperspectral scene (e.g., a second plurality of pixels included in the hyperspectral scene).

Figure 4:
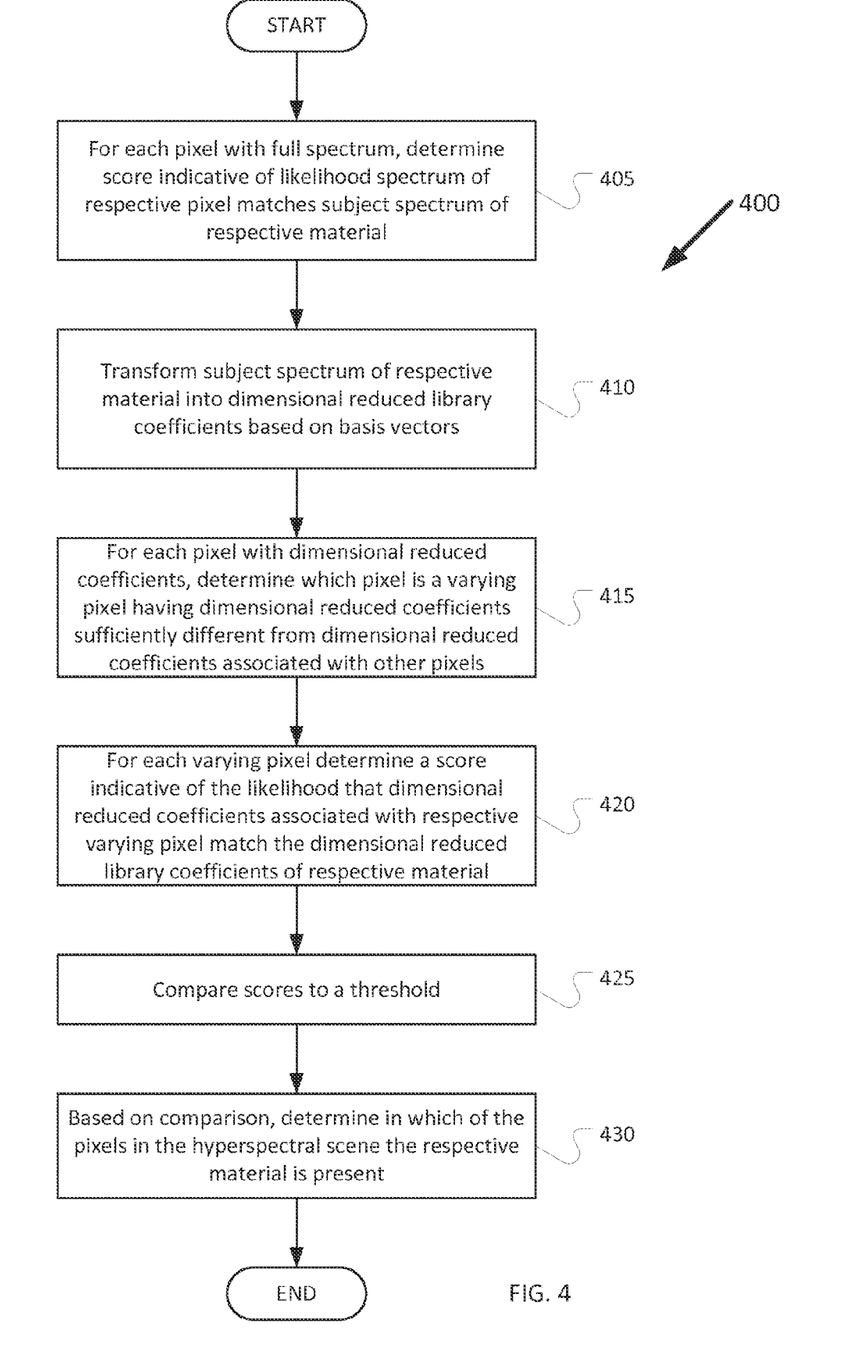
FIG. 4 is a flow chart block diagrams of an example process for detecting materials/targets in scenes.

FIG. 4 shows an example process 400 for detecting materials in a hyperspectral scene, which may be performed by the detecting engine 150. The detecting engine 150 is provided with i) a spectral library of references in which each reference is a spectrum of a material, ii) dimensional reduced representations of the spectra of some pixels in the hyperspectral scene, the representations including basis vectors and dimensional reduced coefficients, and iii) full spectra of other pixels in the hyperspectral scene. The detecting engine 150 starts at 401 and performs the following process steps with respect to a subject spectrum of a respective material from the spectral library of references.

For each pixel with a full spectrum, the detecting engine 150 determines (405) a score indicative of the likelihood spectrum of a respective pixel matches a subject spectrum of a respective material. The detecting engine 150 repeats the determination (405) for each pixel with a full spectrum.

The detecting engine 150 transforms (410) the subject spectrum of the respective material into dimensional reduced library coefficients based on the provided basis vectors.

For each pixel with dimensional reduced coefficients, the detecting engine 150 determines (415) which pixel is a varying pixel having dimensional reduced coefficients sufficiently different from dimensional reduced coefficients associated with other pixels.

For each varying pixel, the detecting engine 150 determines (420) a score indicative of the likelihood that the dimensional reduced coefficients associated with a respective varying pixel match the dimensional reduced library coefficients of the respective material.

The detecting engine 150 compares (425) the scores to a threshold and based on the comparison, the detecting engine 150 determines (430) in which of the pixels in the hyperspectral scene the respective material is present.

The above-described systems and methods can be implemented in digital electronic circuitry, in computer hardware, firmware, and/or software, e.g., in imaging system 102. The implementation can be as a computer program product (i.e., a computer program tangibly embodied in an information carrier medium). The implementation can, for example, be in a machine-readable storage device for execution by, or to control the operation of, data processing apparatus. The implementation can, for example, be a programmable processor, a computer, and/or multiple computers.

In one example, a computer program can be written in any form of programming language, including compiled and/or interpreted languages, and the computer program can be deployed in any form, including as a stand-alone program or as a subroutine, element, and/or other unit in image processor 100 suitable for use in a computing environment to carry out the features and functions of various examples discussed herein. A computer program can be deployed to be executed on one computer or on multiple computers at one site (e.g., in imaging system 102).

Method steps or operations can be performed as processes by one or more programmable processors executing a computer program to perform functions of various examples by operating on input data and generating output. Method steps can also be performed by and an apparatus can be implemented as special purpose logic circuitry. The circuitry can, for example, be a field programmable gate array (FPGA) and/or an application specific integrated circuit (ASIC). Modules, subroutines, and software agents can refer to portions of the computer program, the processor, the special circuitry, software, and/or hardware that implements that functionality.

Detecting engine 150 may comprise one or more processors suitable for the execution of a computer program include, by way of example, both general and special purpose microprocessors, and any one or more processors of any kind of digital computer. Generally, a processor receives instructions and data from a read-only memory or a random access memory or both. The elements of a computer may comprise a processor for executing instructions and one or more memory devices for storing instructions and data. Generally, a computer can include, can be operatively coupled to receive data from and/or transfer data to one or more mass storage devices (e.g., a memory module) for storing data (e.g., magnetic, magneto-optical disks, or optical disks). The memory may be a tangible non-transitory computer-readable storage medium having computer-readable instructions stored therein for processing images, which when executed by one or more processors (e.g., detecting engine 150) cause the one or more processors to carry out or implement the features and functionalities of various examples discussed herein.

Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computing device having a display device. The display device can, for example, be a cathode ray tube (CRT) and/or a liquid crystal display (LCD) monitor, and/or a light emitting diode (LED) monitor. The interaction with a user can, for example, be a display of information to the user and a keyboard and a pointing device (e.g., a mouse or a trackball) by which the user can provide input to the computing device (e.g., interact with a user interface element). Other kinds of devices can be used to provide for interaction with a user. Other devices can, for example, be feedback provided to the user in any form of sensory feedback (e.g., visual feedback, auditory feedback, or tactile feedback). Input from the user can, for example, be received in any form, including acoustic, speech, and/or tactile input.

The above described systems and techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computing device having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system may be coupled to and/or include clients and servers. A client and a server are generally remote from each other and typically interact through a communication network. The relationship of client and server arises by virtue of computer programs running on the respective computing devices and having a client-server relationship to each other.

Communication networks may include packet-based networks, which can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks may include, for example, the public switched telephone network (PSTN), a private branch exchange (PBX), a wireless network (e.g., RAN, Bluetooth, code-division multiple access (CDMA) network, time division multiple access (TDMA) network, global system for mobile communications (GSM) network), and/or other circuit-based networks.

The computing device in imaging system 102 may include, for example, a computer, a computer with a browser device, a telephone, an IP phone, a mobile device (e.g., cellular phone, personal digital assistant (PDA) device, laptop computer, electronic mail device), and/or other communication devices.

The browser device includes, for example, a computer (e.g., desktop computer, laptop computer) with a World Wide Web browser (e.g., INTERNET EXPLORER® available from Microsoft Corporation, of Redmond, Wash.). The mobile computing device includes, for example, a BLACKBERRY® provided by Research In Motion Limited of Waterloo, Ontario, Canada.

"Comprise," "include," and/or plural forms of each are open ended and include the listed parts and can include additional parts that are not listed. "And/or" is open ended and includes one or more of the listed parts and combinations of the listed parts.

Although the above disclosure discusses what is currently considered to be a variety of useful examples, it is to be understood that such detail is solely for that purpose, and that the appended claims are not limited to the disclosed examples, but, on the contrary, are intended to cover modifications and equivalent arrangements that are within the spirit and scope of the appended claims.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:

1. A method for detecting materials in a hyperspectral scene, the method comprising:
    in a detecting engine provided with: i) a spectral library of references in which each reference is a spectrum of a material, ii) dimensional reduced representations of the spectra of a first pluralities of pixels included in the hyperspectral scene, the representations including basis vectors and dimensional reduced coefficients, and iii) full spectra of a second plurality of pixels included in the hyperspectral scene, with respect to a subject spectrum of a respective material from the spectral library of references;
    for each pixel in the second plurality of pixels, determining a score indicative of the likelihood that the spectrum of a respective pixel matches the subject spectrum of the respective material;
    transforming the subject spectrum of the respective material into dimensional reduced library coefficients based on the provided basis vectors; for each pixel in the first plurality of pixels, determining which pixel is a variant pixel having dimensional reduced coefficients sufficiently different from dimensional reduced coefficients associated with other pixels;
    for each variant pixel, determining a score indicative of the likelihood that the dimensional reduced coefficients associated with a respective variant pixel match the dimensional reduced library coefficients of the respective material;
    comparing the scores to a threshold;
    based on the comparison, determining in which of the pixels in the hyperspectral scene the respective material is present;
    calculating an error associated with the dimensional reduced library coefficients of the respective material;
    comparing the calculated error to a second threshold; and based on the comparison determining that the respective material is not present in any of the pixels in the hyperspectral scene represented by dimensional reduced coefficients.

2. The method of claim 1 wherein determining the score indicative of the likelihood that the spectrum of the respective pixel matches the subject spectrum of the respective material includes comparing the spectrum of the respective pixel and the subject spectrum of the respective material, in full dimension, using a Matched Filter or Adaptive Cosine/Coherence Estimator (ACE).

3. The method of claim 1 wherein determining which pixels with dimensional reduced coefficients are variant pixels includes separating the variant pixels from the pixels using Reed-Xiaoli (RX) anomaly detection in reduced dimensional space or residual magnitude scores.

4. The method of claim 1 wherein determining the score indicative of the likelihood that the dimensional reduced coefficients associated with the respective variant pixel match the dimensional reduced library coefficients of the respective material includes comparing the dimensional reduced coefficients associated with the respective variant pixel and dimensional reduced library coefficients of the respective material using a reduced dimension version of a matched filter (MF), Adaptive Cosine/Coherence Estimator (ACE) or (RACE).

5. A system for detecting materials in a hyperspectral scene, the system comprising:
a memory having computer executable instructions thereupon;
at least one interface receiving: i) a spectral library of references in which each reference is a spectrum of a material, ii) dimensional reduced representations of the spectra of a first pluralities of pixels included in the hyperspectral scene, the representations including basis vectors and dimensional reduced coefficients, and iii) full spectra of a second plurality of pixels included in the hyperspectral scene;
a detecting engine coupled to the memory and the at least one interface, the computer executable instructions when executed by the detecting engine cause the detecting engine to, with respect to a subject spectrum of a respective material from the spectral library of references:
for each pixel in the second plurality of pixels, determine a score indicative of the likelihood that the spectrum of a respective pixel matches the subject spectrum of the respective material;
transform the subject spectrum of the respective material into dimensional reduced library coefficients based on the provided basis vectors; for each pixel in the first plurality of pixels, determine which pixel is a variant pixel having dimensional reduced coefficients sufficiently different from dimensional reduced coefficients associated with other pixels;
for each variant pixel, determine a score indicative of the likelihood that the dimensional reduced coefficients associated with a respective variant pixel match the dimensional reduced library coefficients of the respective material;
compare the scores to a threshold;
based on the comparison, determine in which of the pixels in the hyperspectral scene the respective material is present;
calculate an error associated with the dimensional reduced library coefficients of the respective material;
compare the calculated error to a second threshold; and
based on the comparison determine that the respective material is not present in any of the pixels in the hyperspectral scene represented by dimensional reduced coefficients.

6. The system of claim 5 wherein the detecting engine determines the score indicative of the likelihood that the spectrum of the respective pixel matches the subject spectrum of the respective material by comparing the spectrum of the respective pixel and the subject spectrum of the respective material, in full dimension, using a Matched Filter or Adaptive Cosine/Coherence Estimator (ACE).

7. The system of claim 5 wherein the detecting engine determines which pixels with dimensional reduced coefficients are variant pixels by separating the variant pixels from the pixels using Reed-Xiaoli (RX) anomaly detection in reduced dimensional space or residual magnitude scores.

8. The system of claim 5 wherein the detecting engine determines the score indicative of the likelihood that the dimensional reduced coefficients associated with the respective variant pixel match the dimensional reduced library coefficients of the respective material by comparing the dimensional reduced coefficients associated with the respective variant pixel and dimensional reduced library coefficients of the respective material using a reduced dimension version of a matched filter (MF), Adaptive Cosine/Coherence Estimator (ACE) or (RACE).

9. A tangible non-transitory computer-readable storage medium having computer readable instructions stored therein for detecting materials, which when executed by one or more processors provided with: i) a spectral library of references in which each reference is a spectrum of a material, ii) dimensional reduced representations of the spectra of a first pluralities of pixels included in the hyperspectral scene, the representations including basis vectors and dimensional reduced coefficients, and iii) full spectra of a second plurality of pixels included in the hyperspectral scene, cause the one or more processors to, with respect to a subject spectrum of a respective material from the spectral library of references:
for each pixel in the second plurality of pixels, determine a score indicative of the likelihood that the spectrum of a respective pixel matches the subject spectrum of the respective material;
transform the subject spectrum of the respective material into dimensional reduced library coefficients based on the provided basis vectors;
for each pixel in the first plurality of pixels, determine which pixel is a variant pixel having dimensional reduced coefficients sufficiently different from dimensional reduced coefficients associated with other pixels;
for each variant pixel, determine a score indicative of the likelihood that the dimensional reduced coefficients associated with a respective variant pixel match the dimensional reduced library coefficients of the respective material;
compare the scores to a threshold;
based on the comparison, determine in which of the pixels in the hyperspectral scene the respective material is present;
calculate an error associated with the dimensional reduced library coefficients of the respective material;
compare the calculated error to a second threshold; and
based on the comparison determine that the respective material is not present in any of the pixels in the hyperspectral scene represented by dimensional reduced coefficients.

* * * * *